United States Patent
Madhavan et al.

(10) Patent No.: US 9,246,711 B2
(45) Date of Patent: Jan. 26, 2016

(54) WIRELESS MESH NETWORKING WITH MULTIPLE SIMULTANEOUS TRANSMISSIONS BY NEARBY NETWORK NODES

(75) Inventors: Poovanpilli G. Madhavan, Bellevue, WA (US); Abhishek Abhishek, Woodinville, WA (US); Hui Shen, Issaquah, WA (US); Ankur Agiwal, Bellevue, WA (US); Pei Zheng, Sammamish, WA (US); Sharad Mittal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1437 days.

(21) Appl. No.: 11/512,813

(22) Filed: Aug. 30, 2006

(65) Prior Publication Data

US 2008/0056149 A1 Mar. 6, 2008

(51) Int. Cl.
*H04W 4/00* (2009.01)
*H04L 12/66* (2006.01)
*H04W 74/08* (2009.01)

(52) U.S. Cl.
CPC .............. *H04L 12/66* (2013.01); *H04W 74/08* (2013.01)

(58) Field of Classification Search
CPC . H04W 84/12; H04W 74/0816; H04W 74/08; H04W 74/0808; H04L 47/14; H04L 12/413; H04L 12/66
See application file for complete search history.

(56) References Cited

U.S. PATENT DOCUMENTS

| | | | |
|---|---|---|---|
| 5,423,055 A | 6/1995 | Diaz et al. | |
| 6,643,469 B1 | 11/2003 | Gfeller et al. | |
| 6,721,331 B1 | 4/2004 | Agrawal et al. | |
| 6,990,116 B1 | 1/2006 | Young et al. | |
| 2003/0058886 A1 | 3/2003 | Stanforth et al. | |
| 2004/0136396 A1 | 7/2004 | Yonge et al. | |
| 2005/0025176 A1 | 2/2005 | Ko et al. | |
| 2005/0058151 A1* | 3/2005 | Yeh ............................... | 370/445 |
| 2005/0163150 A1 | 7/2005 | Yang et al. | |
| 2005/0176401 A1 | 8/2005 | Nanda et al. | |
| 2005/0201340 A1 | 9/2005 | Wang et al. | |
| 2005/0265503 A1* | 12/2005 | Rofheart et al. .............. | 375/354 |
| 2006/0056442 A1 | 3/2006 | DaCosta et al. | |
| 2006/0109859 A1 | 5/2006 | Acharya et al. | |

(Continued)

FOREIGN PATENT DOCUMENTS

EP 0752192 A 1/1997

OTHER PUBLICATIONS

"A Distributed Transmission Power Control Protocol for Mobile Ad Hoc Networks" Muqattash, A; Krunz ,M; IEEE transactions vol. 3, Issue2, Apr.-Jun. 2004.*

(Continued)

*Primary Examiner* — Ajit Patel
(74) *Attorney, Agent, or Firm* — Sunah Lee; Judy Yee; Micky Minhas

(57) ABSTRACT

A wireless mesh network enables multiple devices near each other to transmit simultaneously, thus allowing increased network bandwidth. Prior to transmitting, a device may determine various parameters of the wireless medium on which it desires to transmit. For example, the device may determine whether the intended recipient device is close enough, and verify that any other transmitting and receiving devices are far enough away. If these or any other suitable criteria are met, the device can transmit simultaneously with other devices in the vicinity.

21 Claims, 5 Drawing Sheets

(56) References Cited

U.S. PATENT DOCUMENTS

2007/0002803 A1* 1/2007 Destino et al. .............. 370/335
2007/0105573 A1* 5/2007 Gupta et al. .............. 455/509

OTHER PUBLICATIONS

Acharya et al., "MACA-P: A MAC for concurrent transmissions in multi-hop wireless networks", pp. 1-4, IBM TJ Watson Research Center, Stanford University.
Akyildiz et al., "Wireless mesh networks: a survey", 2004, http://bcr2.uwaterloo.ca/~mesh/Papers/General/Wireless%20mesh%20networks%20-%20%20survey.pdf.
Cesana et al., "Interference aware (IA) MAC: an enhancement to IEEE802.11b DCF", 5 pgs., University of California Los Angeles, Los Angeles, CA.
Jun et al., "The nominal capacity of wireless mesh networks", *IEEE Wireless Communications*, Oct. 2003, pp. 8-15, vol. 10, issue 5, http://ieeexplore.ieee.org/xpl/freeabs_all.jsp?arnumber.
Jun, Jangeun, "Capacity estimation of wireless mesh networks", 2002, http://www.lib.ncsu.edu/theses/available/etd-11062002-163505/unrestricted/etd.pdf.
Nadeem et al., "Location enhancement to IEEE 802.11 DCF", In *Proceedings of IEEE INFOCOM* 2005, Mar. 13-17, 2005, Miami, Florida, 13 pgs.
Shukla et al., "Mitigating the exposed node pioblem in IEEE 802.11 ad hoc networks", K.R. School of Information Technology, Indian Institute of Technology Bombay, Powai, Mumbai, India, pp. 1-6.
Zhu et al., "Maximizing aggregate throughput in 802.11 mesh networks with physical carrier sensing and two-radio multi-channel clustering", http://www.ee.washington.edu/research/funlab/Publications/2004/Max_aggr_thruput.pdf.
International Search Report dated Feb. 1, 2008 from corresponding International Application No. PCT/US2007/076916.
Muqattash, et al., A Distributed Transmission Power Control Protocol for Mobile Ad Hoc Networks, Department of Electrical and Computer Engineering, The University of Arizona, Tucson, AZ 85721, pp. 1-19.
Guo, et al., Spatial Reuse in Wireless Ad-hoc Networks, Network Architecture Lab, Communication and Interconnect Technology Lab, Intel Corporation, 2111 NE $25^{th}$ Ave., JF3-206, Hillsboro, OR 97124, pp. 1427-1442 (2003).
Extended European Search Report from EP App. No. 07841424.0; Mailing Date Feb. 14, 2013; 7 pages.
First Office Action from CN App. No. 200780032061.4; Mailing Date Jul. 6, 2011; 10 pages.
Second Office Action from CN App. No. 200780032061.4; Mailing Date Feb. 13, 2012; 7 pages.

* cited by examiner

WIRELESS MESH NETWORKING WITH MULTIPLE SIMULTANEOUS TRANSMISSIONS BY NEARBY NETWORK NODES

BACKGROUND

In wireless mesh networks, multiple devices or "nodes" communicate wirelessly with one another by sending and receiving wireless messages, which are often radio frequency (RF) messages that conform to a protocol, such as IEEE Standard 802.11. Mesh networks allow the nodes of the network to communicate with one another without the direct exchange of RF messages between the two nodes in communication. For example, two devices that are not within range of each other may communicate via one or more other nodes in the network. Wireless messages are received at a node and re-transmitted, such that the message is passed from node to node until the message reaches the destination node. Since there may be many suitable paths through the mesh network, wireless mesh networks can be more robust than traditional wireless networks. For example, if a node along a chosen path fails, the message can be rerouted through a different path. Such rerouting may be performed automatically, enabling the wireless mesh network to be self-healing in response to node failures. Another advantage of wireless mesh networks is that they can reduce the need for fixed infrastructure, as nodes can communicate with one another at a distance without the need for fixed access points.

One difficulty with mesh networks is that of coordinating the transmissions of various devices that are in the vicinity of one another. If multiple devices near each other transmit at the same time, the transmissions may interfere with one another and reduce the data rate that is achievable. To prevent this type of interference, various types of media access control (MAC) protocols can be used. Carrier Sense Multiple Access with Collision Avoidance (CSMA/CA) is one such MAC protocol, in which a device informs other nodes in the vicinity of its intent to transmit, prior to transmitting. Upon receiving notice that a device intends to transmit, the other nodes in the vicinity then wait to transmit, so as to avoid transmitting at the same time, thereby reducing the likelihood of interfering transmissions.

SUMMARY

In previous wireless mesh networks, the bandwidth of the network may be limited when several devices or "nodes" of the network are close to one another. Previous collision avoidance protocols for preventing interference, such as CSMA/CA, only allowed one device in the vicinity to transmit at a time, thus limiting the bandwidth achievable. Embodiments of the invention relate to methods, devices and computer-readable media that enable multiple devices in a wireless mesh network to transmit at the same time. Prior to transmitting, a device may check to see if another device in the mesh network, e.g., using the same protocol, is currently transmitting on the wireless medium. If another device is transmitting, the device that wishes to transmit data may evaluate one or more criteria to determine whether it can transmit simultaneously with the other device. As one example, a device may be allowed to transmit to a device that is sufficiently close to the device that desires to transmit, as long as there are no other devices nearby transmitting or receiving on the same medium. These techniques can provide improved bandwidth and performance in wireless mesh networks.

One embodiment of the invention relates to a method of communicating in a wireless network environment that includes a first device, a second device and a third device. The first device desires to wirelessly transmit data to the second device using a particular wireless protocol. However, the third device is transmitting and/or receiving data using a same wireless protocol as the first device. The method includes obtaining at least one first wireless medium parameter between the first device and the second device. In addition, at least one second wireless medium parameter is obtained between the first device and the third device. The method also includes determining, based on the at least one first and the at least one second wireless medium parameters, whether to wirelessly transmit the data.

Another embodiment of the invention relates to a computer-readable medium having computer-executable instructions, which, when executed, perform a method of communicating in a network environment. A first device desires to wirelessly transmit data to a second device using a wireless protocol, while a third device is transmitting data to a fourth device using a same wireless protocol as the first device. The method includes obtaining at least one first wireless medium parameter between the first device and the second device. In addition, at least one second wireless medium parameter is obtained between the first device and the third device, and a third wireless medium parameter is obtained between the first device and the fourth device. The method also includes determining, based on the at least one first, second and third wireless medium parameters, whether to wirelessly transmit the data.

Another embodiment of the invention relates to a first device operative to communicate in a network environment to wirelessly transmit data to a second device using a wireless protocol. The network environment also includes a third device that is transmitting data to a fourth device using a same wireless protocol as the first device. The device includes a processor operative to: obtain at least one first parameter representative of a distance between the first device and the second device; obtain at least one second parameter representative of a distance between the first device and the third device; obtain at least one third parameter representative of a distance between the first device and the fourth device; and determine, based on the at least one first, the at least one second and the at least one third parameters, whether to wirelessly transmit the data. The first device also includes a wireless communication connection operative to transmit the data.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
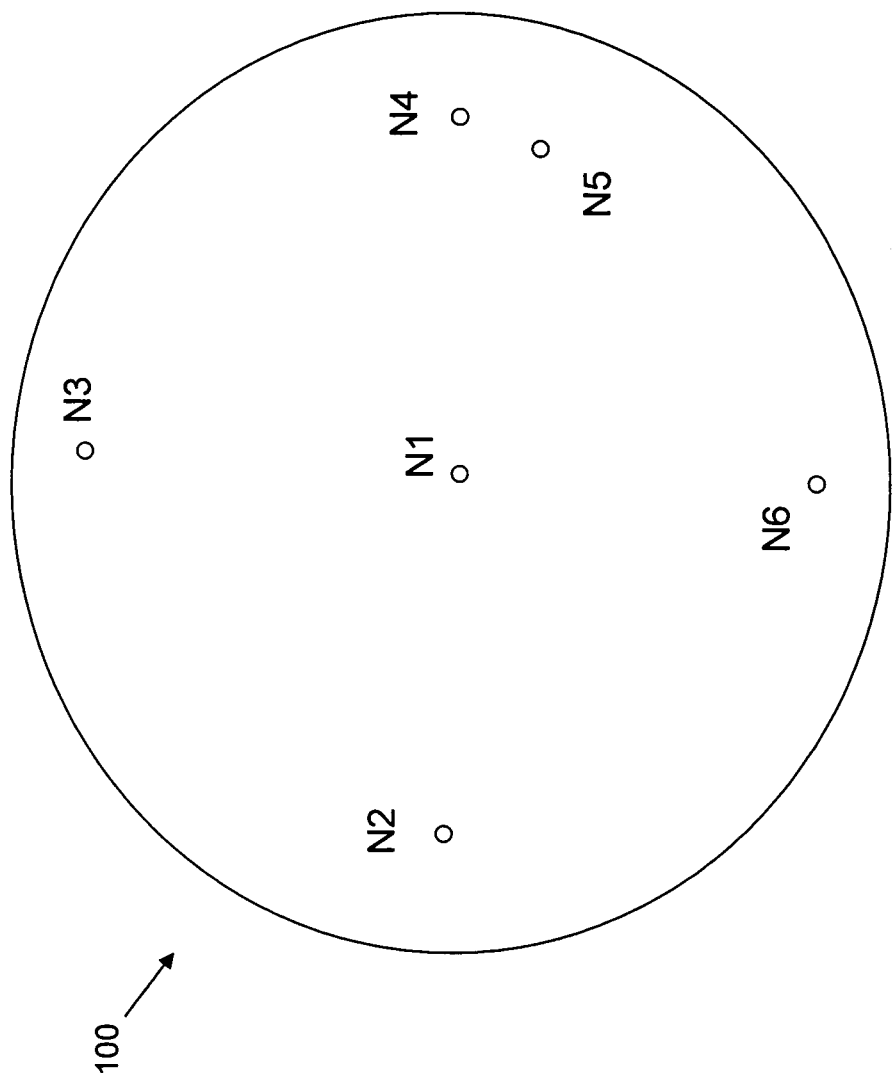
FIG. 1 illustrates a network environment in which embodiments of the invention may be implemented.

Wireless mesh networks can be relatively inexpensive and reliable communication networks. However, the bandwidth of wireless mesh networks can be relatively limited in certain situations. For example, when multiple nodes are in range of each other, standard MAC protocols for preventing interfering transmissions, such as CSMA/CA, may only allow a single device to transmit at a time. In a mesh network with multiple nodes within range of each other, multiple devices may have to wait to transmit until no other devices are transmitting, even though some of the nodes may be able to communicate effectively with one another without interfering with the concurrent transmission by a different nearby device. Thus, standard CSMA/CA protocol may limit the bandwidth that can be achieved in a wireless mesh network. The Applicants have appreciated that it may be desirable to enable multiple devices to transmit simultaneously if certain criteria are met. For example, if two devices that wish to communicate are close enough to one another and far enough away from any devices that are currently sending or receiving data, the two devices may be able to communicate effectively with one another without disturbing the communications that are already in progress. In accordance with the invention, devices may operate according to the framework of CSMA/CA or any other suitable protocol, making aspects of the invention compatible with legacy systems. In some aspects of the invention, a device may operate according to a modified CSMA/CA protocol in which a device determines whether or not to transmit, despite knowing that a device in the area is already transmitting. Some embodiments of the invention provide methods for a device to determine whether to initiate such a transmission, and will be discussed in further detail.

In conventional mesh networks, data rates are higher when the distance between the nodes is smaller. Using shorter "hops" between nodes allows the network to take advantage of improved signal-to-noise ratios that are achievable at smaller distances. However, this conventional analysis does not take into account the activity of other nodes in the vicinity. When there are many nodes operating in the vicinity, access to the wireless medium (e.g., the channel) can be limited due to the use of a collision avoidance protocol, resulting in lower bandwidth than could be achieved without the activity of the nearby nodes. Thus, transmitting to the closest node no longer ensures the highest data rate.

In some embodiments of the invention, when a node desires to transmit data at the same time as another node, it may determine whether or to transmit based on one or more criteria, such as one or more wireless medium parameters, e.g., distance and/or signal strength. For example, the node may transmit if it is sufficiently close to the node to which it desires to transmit data, and if it is sufficiently far away from any nodes currently sending or receiving data. In general, the determination may be made based on a wireless medium parameter between the node that desires to transmit and one or more of the following other nodes: 1) the node to which it desires to transmit, 2) a node currently transmitting data, and 3) a node currently receiving data. Any suitable criteria may be used for determining whether or not to transmit, as the invention is not limited in this respect.

FIG. 1 illustrates a network environment 100 in which embodiments of the invention may be implemented. Network environment 100 includes nodes N1-N6, each of which may transmit and/or receive wireless communications. It should be appreciated that embodiments of the invention may be implemented in any suitable network environment, and the invention is not limited as to the type or number of nodes in the network environment.

Nodes N1-N6 may each include a device suitable for transmitting and/or receiving wireless messages, such as device 500 discussed in further detail below. The device may be a wireless-enabled device, such as a computer, access point, personal digital assistant (PDA) or any other suitable device, as the invention is not limited in this respect. The device may communicate wirelessly according to any suitable protocol, such as IEEE Standard 802.11, UWB or Bluetooth.

As illustrated in FIG. 1, nodes N1-N6 have a wireless range such that each node N1-N6 is capable of sending and receiving wireless messages to/from any of nodes N1-N6 within network environment 100. According to prior CSMA/CA techniques, only one of the nodes in network environment 100 could transmit data at a time. According to these prior techniques, if a device wishes to transmit data, it may first listen to determine if any other devices are currently transmitting data. If so, the device will wait until a later time to transmit the data. However, if the device determines that no other node is transmitting data, then it may broadcast its intent to transmit so that the other nodes will be aware of the imminent transmission and not transmit at the same time. As discussed above, only allowing one device to transmit at a time may limit the bandwidth achievable in a wireless mesh network. The Applicants have appreciated that it may increase network bandwidth if certain nodes are allowed to broadcast simultaneously. In accordance with some embodiments of the invention, a node can broadcast at the same time as another node if the intended receiving node is relatively close to the intended sending node, and the intended receiving node and/or the intended sending node are far away from other transmitting or receiving devices. For example, if node N2 is currently transmitting to node N3, node N5 may be allowed to transmit to node N4 because nodes N5 and N4 are relatively close to one another and relatively far away from both nodes N2 and N3.

As used herein, the term "wireless medium parameter" means a parameter of the wireless medium on which a device is transmitting data, receiving data and/or intending to transmit and/or receive data. Any suitable wireless medium parameter may be used, such as the physical distance between two devices, the effective distance between two devices and/or the strength of a signal received from a device. In one embodiment of the invention, the wireless medium parameter may be the physical distance between two devices. The physical distance may be measured in any suitable way, such as using a built-in technique of the underlying wireless protocol used, such as IEEE Standard 802.11, Ultrawideband (UWB), or Bluetooth, or using any other suitable means for measuring the physical distance. In some embodiments, the wireless medium parameter may be an "effective distance" between the two devices. For example, an effective distance between two devices may be determined partially based on the physical distance between devices, and partially based on other criteria, such as the amount of interference between the two devices, the physical medium on which the data is sent e.g., whether there is a wall between the devices, etc. The effective distance may be determined by modifying the physical distance by such considerations of the physical medium. In some embodiments, the wireless medium parameter may be the strength of a wireless message received from a give node, may be based on or derived from the signal strength of a wireless message received from a given node. Any suitable wireless medium parameter or combination of wireless medium parameters may be obtained and used to determine whether or not data should be transmitted, as the invention is not limited as to the type or number of wireless medium parameters on which the determination is based.

In some embodiments of the invention, one, several or all of the devices in the wireless mesh network may maintain a database of wireless medium parameters between devices in the network (e.g., devices located in the vicinity). The parameters may be stored in the database in the form of a table, or in any other suitable structure. The invention is not limited to the manner in which the wireless medium parameter is obtained, as it may be obtained in any suitable way. For example, the wireless medium parameter may be measured by a device or received from another device that performs the measuring. Also, the invention is not limited as to the location or manner in which wireless medium parameters are stored, as they may be stored by one, several or all of the devices located nearby, or stored in a different location, and may be stored in a database as a table, or in any other suitable storage medium or format.

Figure 2:
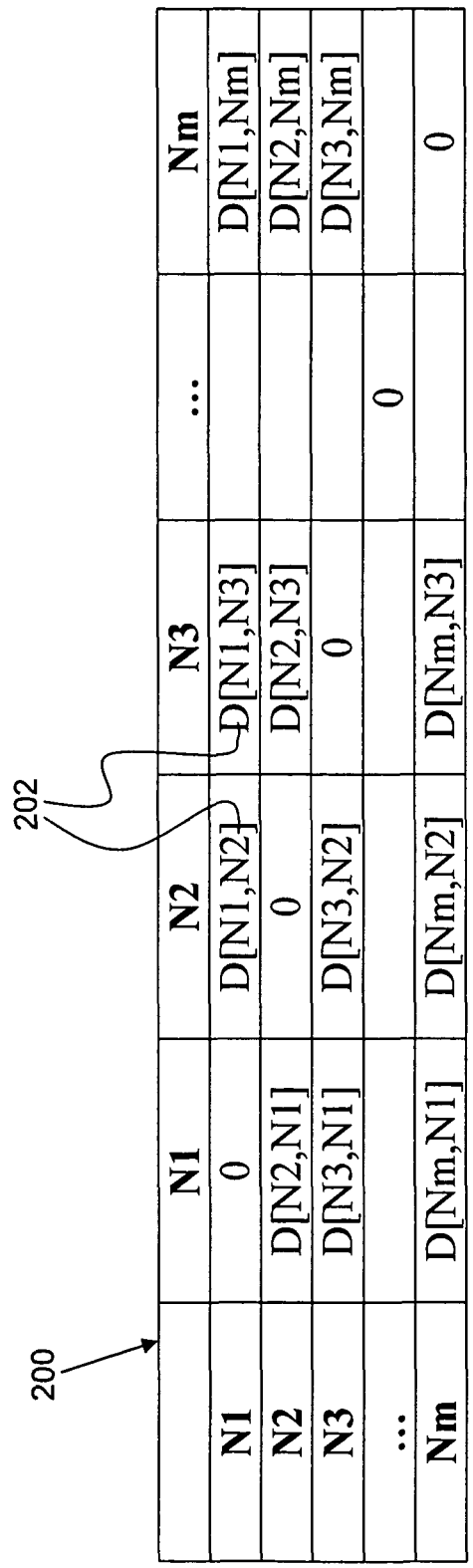
FIG. 2 illustrates a table that includes effective distances between devices in a mesh network, according to some embodiments of the invention.

FIG. 2 illustrates a table 200 that includes wireless medium parameters 202 for communications between nodes N1-Nm in a mesh network, according to some embodiments of the invention. Table 200 may be stored in a device associated with any one or more node(s) of wireless computing environment 100. Table 200 can include any suitable wireless medium parameters, such as physical distance or effective distances between respective nodes in the network or signal strength parameters. The parameters that are stored in table 200 may be continuous values, or they may be discrete values. For example, if the values are continuous, table 200 may store the actual distance between the respective nodes. However, if the values are discrete, table 200 may store a discrete wireless medium parameter that represents a range in which the actual wireless medium parameter falls. For example, table 200 may store identifiers that represent a range that a distance falls within, e.g., whether the distance is relatively small, medium or large (s, m or L), as will be discussed in further detail below. The use of the wireless medium parameters in determining whether to transmit data will now be discussed in further detail.

Figure 3:
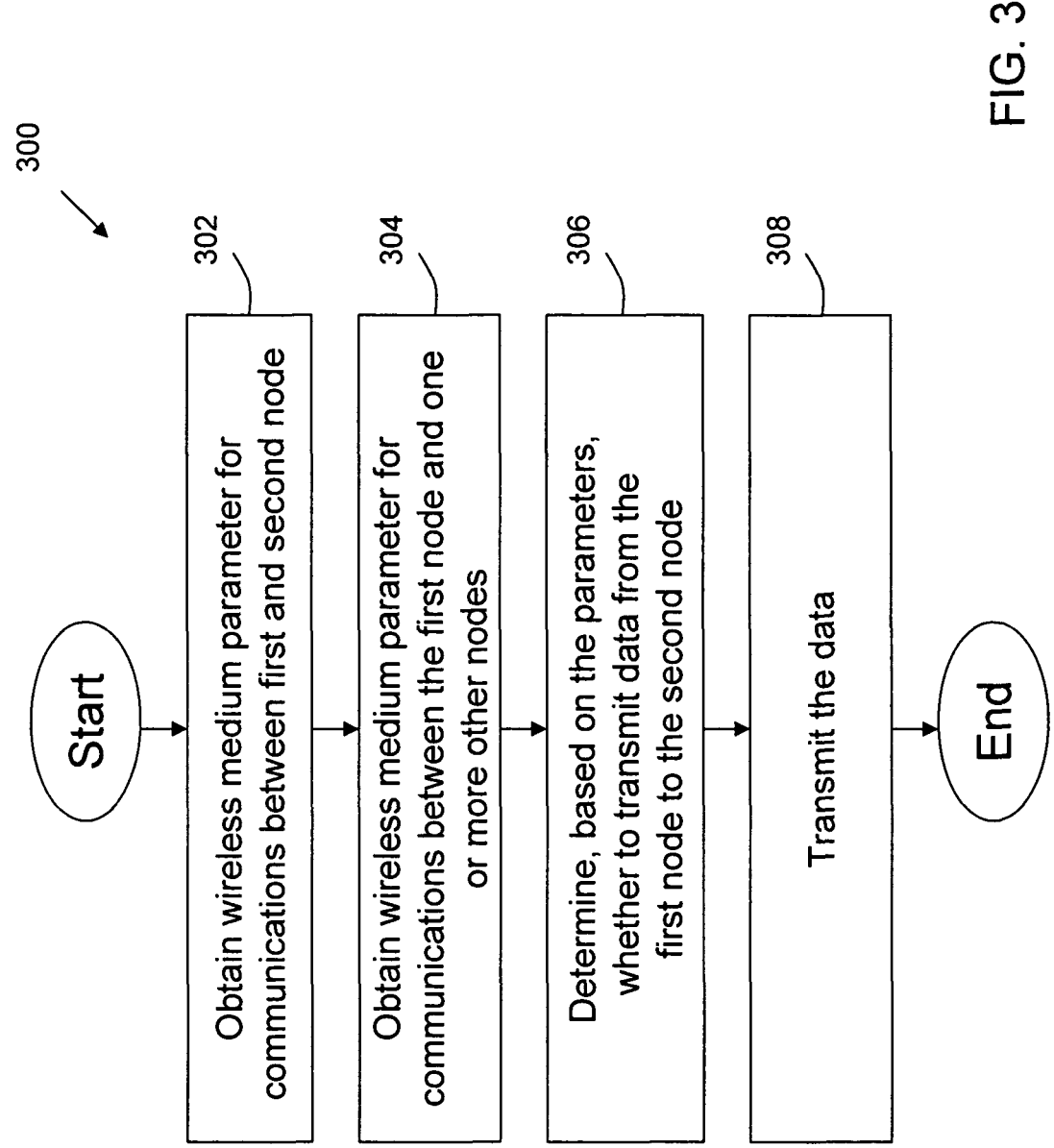
FIG. 3 is a flowchart illustrating a method of communicating between devices in a mesh network, according to some embodiments of the invention.

FIG. 3 is a flowchart illustrating a method 300 of communicating between nodes in a wireless network environment. Method 300 may be performed by a device that desires to transmit data, e.g., a device that has a packet queued for transmission, or any other suitable device. Using method 300, multiple nodes in a wireless mesh network can transmit simultaneously to other nodes in the vicinity, which can increase the bandwidth and improve the performance of a wireless mesh network.

In step 302, a device may obtain a wireless medium parameter for communications with another device to which it desires to transmit data. The wireless medium parameter may be any suitable wireless medium parameter, e.g., distance and/or signal strength, as discussed above. The wireless medium parameter may be obtained in any suitable way. In some embodiments of the invention, the wireless medium parameter may be measured by the device that desires to transmit data, using any suitable measurement technique. In some embodiments the wireless medium parameter may be measured by a different device, and provided to the device that desires to transmit the data. However, the invention is not limited in this respect, as any suitable means may be used to obtain the desired wireless medium parameter.

In step 304, the device that desires to transmit data may obtain one or more other wireless medium parameters. For example, if another node in the vicinity may be transmitting or receiving data. To ensure that transmitting will not disrupt these communications or be disrupted by them, the device may determine the distance to the transmitting or receiving device to ensure that it is far enough away to avoid interference. The wireless medium parameter(s) may be obtained in any of the ways discussed above with respect to step 302, or in any other suitable way.

In step 306, the device may determine, based on the wireless medium parameters, whether or not to transmit the data. For example, software and/or hardware associated with the device may evaluate the obtained wireless medium parameters to determine if they meet one or more criteria. As one example, the device may determine whether the distance to the intended receiving device is short enough, and that the distance to any other transmitting and receiving nodes is large enough. However, any suitable criteria may be used, as the invention is not limited in this respect. If the criteria are met, the device may transmit the data in step 308.

In one embodiment, the device may be allowed to transmit if the distance between the device and the device it wishes to transmit falls within a "short" (s) distance range, and the distance between the device and any currently transmitting or receiving devices falls within a "large" (L) distance range. If these criteria are not met, the device may not transmit, and may wait to transmit the data. Any suitable ranges may be chosen for the short (s), medium (m) and large (L) distance ranges. In one implementation, if R=PLCP header range (~35 meters for 802.11a), the distance ranges may be defined as follows: distance d=L≥R/2, d=s≤R/10 and d=m otherwise. However, the invention is not limited to these particular ranges, as one of ordinary still in the art will readily appreciate that other suitable ranges may be chosen.

In one aspect of the invention, the criteria used for determining whether or not to transmit may be modified depending on how many nodes are currently transmitting in the vicinity. For example, more conservative values of s, m and L may be chosen if a greater number of nodes are currently transmitting (e.g., for three nodes currently transmitting, s3≤s2≤s1 and L3≥L2≥L1). Using more conservative criteria for additional nodes may help take into account the effect of the greater amount of interference that has been added to the channel as further nodes have begun transmitting.

In another aspect of the invention, if a device does not meet the criteria discussed above, the device may transmit, but at a reduced power. For example, if the distance between the device that wishes to transmit and the intended receiving device is d=m, and the distance to any other transmitting or receiving node is d=L, the decision about whether or not to transmit is not as clear as in the case where d=s between the device that wishes to transmit and the intended recipient. In such a circumstance, rather than not transmitting, the device may transmit but at a reduced power. Any suitable reduced power level may be used. Transmitting at a reduced power may be used in any suitable circumstance where the wireless medium parameters do not meet the requirements for transmitting, but only miss the criteria by a relatively small amount.

Figure 4:
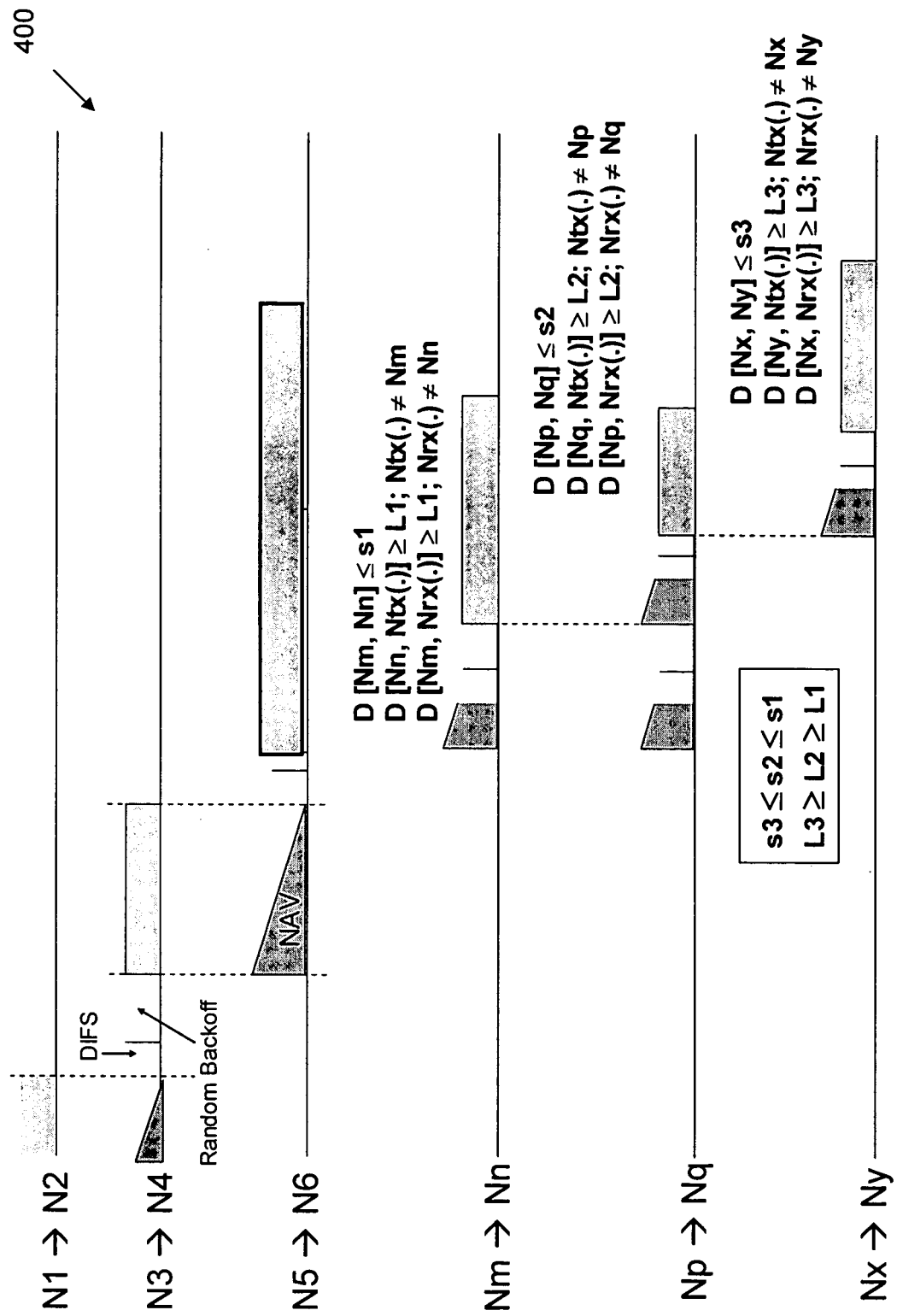
FIG. 4 is a timing diagram illustrating the times at which various devices transmit, according to some embodiments of the invention.

FIG. 4 is a timing diagram 400 illustrating the times at which various devices transmit, according to an embodiment of the invention. In this diagram, nodes N1-N6 operate according to prior CSMA/CA methods, while nodes m, n, p, q, x and y operate according to an embodiment of the invention. In this diagram, the horizontal axis represents time, the blocks represent periods when a device is transmitting, and the linearly decaying portions represent a device's network allocation vector (NAV) as it counts down. In CSMA/CA, a device's NAV may be a counter set to count down the amount of time remaining for a different device's transmission period. The length of the NAV period may be determined when a device receives a PCLP header from another device, indicating the amount of time it intends to transmit. The NAV counts down, and when NAV=0, the device may transmit data (after an appropriate back-off period).

The top left of timing diagram 400 illustrates an example in which node N1 is finishing transmitting to node N2, while N3 has data queued for transmission. Once node N1 is finished transmitting, node N3 waits a standard period of length DIFS, and then a random back-off period to avoid collisions. Once the random back-off period has expired, node N3 begins transmitting to node N4. Node N5 also has data queued for transmission, and N5's NAV starts counting down from the amount of time that node N3 has indicated it will be transmitting. Once N5's NAV=0, node N5 waits the time period DIFS and a random back-off, then begins transmitting. According to this prior CSMA/CA approach, only one device is transmitting at a time.

Nodes Nm and Np operate according to an embodiment of the invention, and both have data queued to transmit. Before Nm and Np's NAV reaches 0, these devices determine that they can transmit, based on distance criteria, for example. In response to this determination, both Nm and Np's NAVs are set to 0. Both devices wait DIFS and a random back-off, and node Nm's random back-off period is shorter, and begins transmitting. At this point, two devices in the vicinity are transmitting—both node N5 and N5. In response to receiving node Nm's PLCP header, node Np's NAV is set to a non-zero value, and begins counting down. However, before Nm's NAV reaches 0, it checks to determine whether it meets the criteria for transmitting simultaneously with the other devices. In this example, node Np has to meet stricter criteria (a smaller s value and larger L value) for transmitting than device Nm had to, because now two devices are transmitting. Node Np determines that it meets these criteria, and begins transmitting. Node Nx then has packets queued, and now has to meet even stricter requirements for transmitting. Node Nx determines that it meets these criteria, and begins transmitting.

Figure 5:
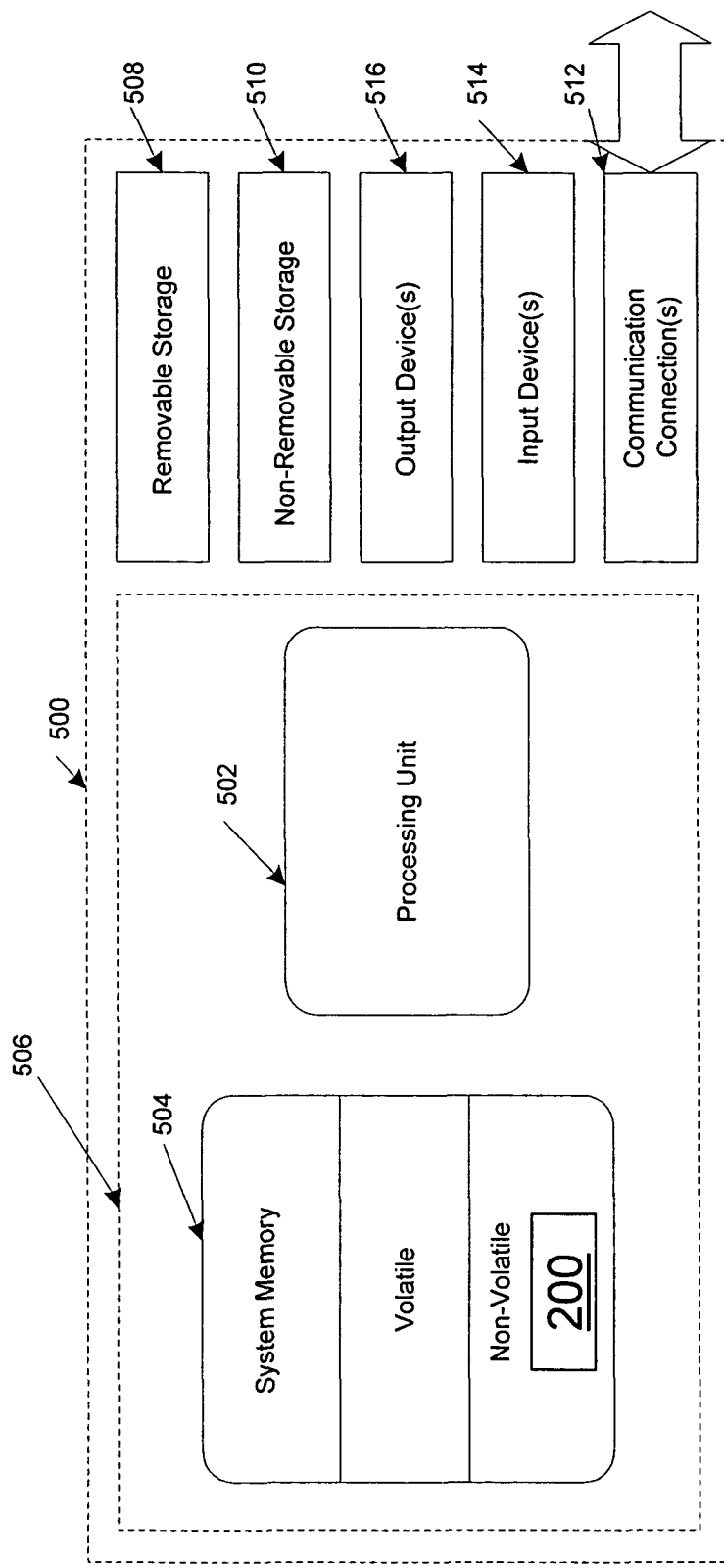
FIG. 5 is a diagram illustrating a general-purpose computer system in which embodiments of the invention can be implemented.

A general-purpose computing system will now be described, on which embodiments of the invention may be implemented. With reference to FIG. 5, an exemplary system for implementing embodiments of the invention includes a computing device, such as computing device 500, which may be a device suitable to function as a node of network environment 100. Computing device 500 may include at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, device 500 may also have additional features/functionality. Memory 504 is a form of computer-readable media that may store table 200, having wireless medium parameters for various nodes in network environment 100.

Device 500 may include at least some form of computer readable media. Computer readable media can be any available media that can be accessed by device 500. By way of example, and not limitation, computer readable media may comprise computer storage media and communication media. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Device 500 may also contain communications connection(s) 512 that allow the device to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 500 may also have input device(s) 514 such as keyboard, mouse, pen, voice input device, touch input device, etc. Output device(s) 516 such as a display, speakers, printer, etc. may also be included. All these devices are well know in the art and need not be discussed at length here.

It should be appreciated that the invention is not limited to executing on any particular system or group of systems. For example, embodiments of the invention may run on one device or on a combination of devices. Also, it should be appreciated that the invention is not limited to any particular architecture, network, or communication protocol.

Having now described some embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. The foregoing description and drawings are by way of example only. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. The use of "including," "comprising," or "having," "containing," "involving," and variations thereof herein, is meant to encompass the items listed thereafter and equivalents thereof as well as additional items.

What is claimed is:

1. A method of controlling wireless transmissions of a first device into a wireless medium, the method comprising:
   obtaining a first wireless medium parameter that characterizes a communications path between the first device and a second device;
   determining a range indicator for the first wireless parameter, the range indicator being:
      a first value if the first wireless medium parameter falls within a first range;
      a second value if the first wireless medium parameter falls within a second range; and
      a third value if the first wireless medium parameter falls within a third range, wherein the third range is between the first and second ranges, wherein the first value represents a greater separation between the first and second devices than the third value, and wherein the third value represents a greater separation between the first and second devices than the second value;
   obtaining a second wireless medium parameter that characterizes a communications path between the first device and a third device; and
   selectively controlling, by the first device, the wireless transmission of the first device into the wireless medium based on the determined range indicator and on the second wireless parameter.

2. The method of claim 1, wherein the third device is transmitting to and/or receiving data from a fourth device, and the method further comprises:
   obtaining a third wireless medium parameter that characterizes a communications path between the first device and the fourth device;
   wherein the selectively controlling of the wireless transmission is additionally based on the third wireless medium parameter.

3. The method of claim 1, wherein the first wireless medium parameter represents a distance between the first device and the second device.

4. The method of claim 1, wherein the first wireless medium parameter represents a signal strength.

5. The method of claim 1, wherein the first wireless medium parameter represents an effective radio frequency distance between the first device and the second device.

6. The method of claim 1, further comprising:
   selecting an extent of the first range, the second range, and/or the third range based on a number of devices in a vicinity of the first device.

7. The method of claim 1, wherein the selectively controlling of the wireless transmission includes:
   adjusting a signal strength for the wireless transmission based on the determined range indicator and/or the second wireless medium parameter.

8. The method of claim 1, wherein the first device communicates with the second and third devices via an Ultrawideband (UWB) protocol.

9. The method of claim 1, wherein the first device communicates with the second and third devices in accordance with an IEEE Standard 802.11 protocol.

10. The method of claim 1, wherein the first device communicates with the second and third devices in accordance with a carrier sense multiple access/collision avoidance (CSMA/CA) protocol.

11. The method of claim 1, wherein the selectively controlling of the wireless transmission includes:
    selectively enabling the first device to transmit into the wireless medium simultaneously with transmissions from another device.

12. The method of claim 1, wherein the first, second, and third devices are nodes in a wireless mesh network.

13. A computer-readable storage device having computer-executable instructions stored therein, which, when executed, perform operations for controlling wireless transmissions of a first device into a wireless medium, the operations comprising:
    obtaining a first wireless medium parameter that characterizes a communications path between the first device and a second device;
    determining a range indicator for the first wireless parameter, including:
       selecting a first value for the range indicator if the first wireless medium parameter is in a first range;
       selecting a second value for the range indicator if the first wireless medium parameter is in a second range, and
       selecting a third value for the range indicator if the first wireless medium parameter is in a third range, wherein the third range is between the first and second ranges, and wherein the first value represents a greater separation between the first and second devices than the third value, and wherein the third value represents a greater separation between the first and second devices than the second value;
    obtaining a second wireless medium parameter that characterizes a communications path between the first device and a third device; and
    selectively controlling, by the first device, the wireless transmission of the first device into the wireless medium based on the determined range indicator and on the second wireless parameter.

14. The computer-readable storage device of claim 13, wherein the selectively controlling of the wireless transmission includes:
    selectively enabling the first device to transmit into the wireless medium while another device is transmitting into the wireless medium.

15. The computer-readable storage device of claim 13, wherein the first wireless medium parameter represents a distance between the first device and the second device and/or represents a signal strength of a transmission through the wireless medium.

16. The computer-readable storage device of claim 13, wherein the first, second, and third devices are nodes in a wireless mesh network.

17. A first device operative to transmit data to a second device over a wireless medium using a wireless protocol, the first device comprising:
    a memory and a processor that respectively store and execute instructions, including instructions that:
       obtain a first wireless medium parameter that characterizes a communications path between the first device and a second device;
       determine a range indicator for the first wireless parameter, the range indicator being:
          a first value if the first wireless medium parameter falls within a first range;
          a second value if the first wireless medium parameter falls within a second range, and
          a third value if the first wireless medium parameter falls within a third range, wherein the third range is between the first and second ranges, and wherein the first value represents a greater separation between the first and second devices than the third value, and wherein the third value represents a greater separation between the first and second devices than the second value;
obtain a second wireless medium parameter that characterizes a communications path between the first device and a third device; and
selectively control the wireless transmission of the first device into the wireless medium to the second device based on the determined range indicator and on the second wireless parameter; and
a wireless radio configured to interface the first device to the wireless medium.

18. The first device of claim 17, wherein the first range is contiguous with the third range, wherein the third range is contiguous with the second range.

19. The first device of claim 18, wherein the instructions include additional instructions that:
obtain a third wireless medium parameter that characterizes a communications path between a fourth device and a fifth device;
obtain a fourth wireless medium parameter that characterizes a communications path between the second device and the fourth device; and
selectively control the wireless transmission of the first device to the fifth device through the wireless medium based on the determined range indicator, the second wireless medium parameter, the third wireless medium parameter, and the fourth wireless medium parameter.

20. The method of claim 1, wherein the method further comprises:
obtaining a third wireless medium parameter that characterizes a communications path between a fourth device and a fifth device;
obtaining a fourth wireless medium parameter that characterizes a communications path between the second device and the fourth device; and
selectively controlling the wireless transmission of the first device to the fifth device based on the determined range indicator, the second wireless medium parameter, the third wireless medium parameter, and the fourth wireless medium parameter.

21. The method of claim 1, wherein selectively controlling the wireless transmission of the first device into the wireless medium includes:
transmitting into the wireless medium at a first power level for a first combination of values for the determined range indicator and the second wireless parameter;
transmitting into the wireless medium at a second power level for a second combination of the values for the determined range indicator and the second wireless parameter; and
not transmitting into the wireless medium for a third combination of the values for the determined range indicator and the second wireless parameter.

* * * * *